S. TRENNER.
LENS BORDERING AND LIGHT CONSERVING AND DISTRIBUTING DEVICE FOR HEADLIGHTS OF AUTOMOBILES, &c.
APPLICATION FILED OCT. 5, 1916.
1,274,817.
Patented July 30, 1918.
3 SHEETS—SHEET 2.
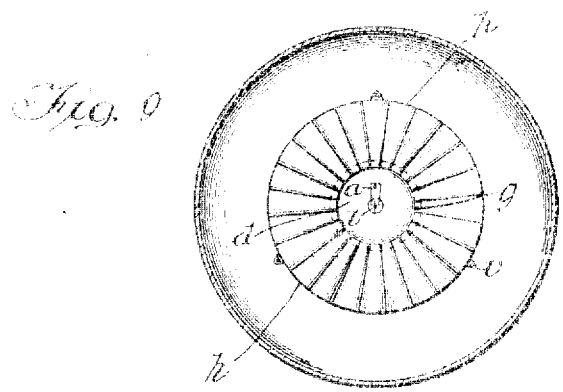
Fig. 9
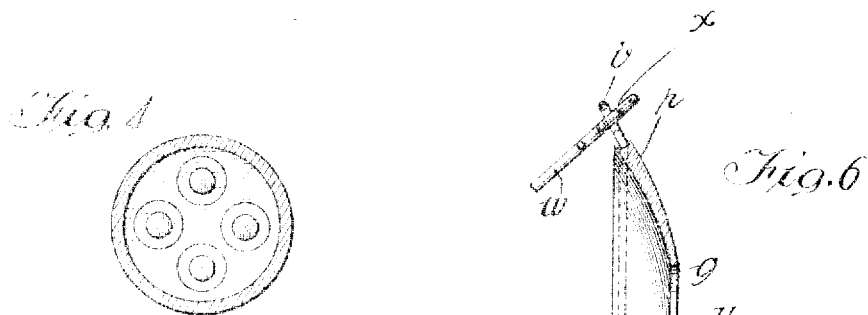
Fig. 4
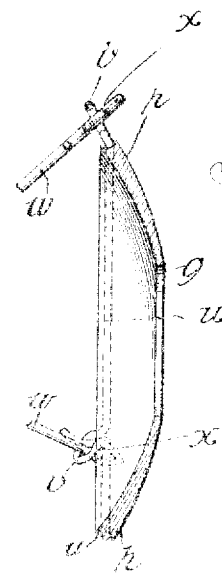
Fig. 6
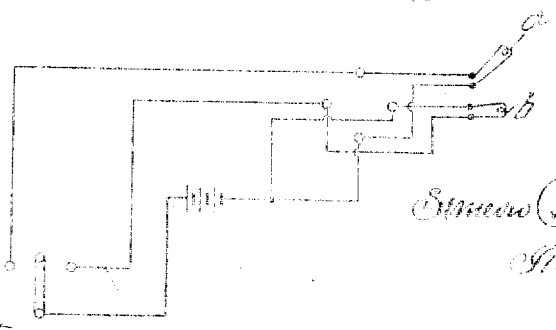
Witnesses:
Simeon Trenner
Inventor S. TRENNER.
GLARE SUBDUING AND LIGHT CONSERVING AND DISTRIBUTING DEVICE FOR HEADLIGHTS OF AUTOMOBILES, &c.
APPLICATION FILED OCT. 9, 1916.

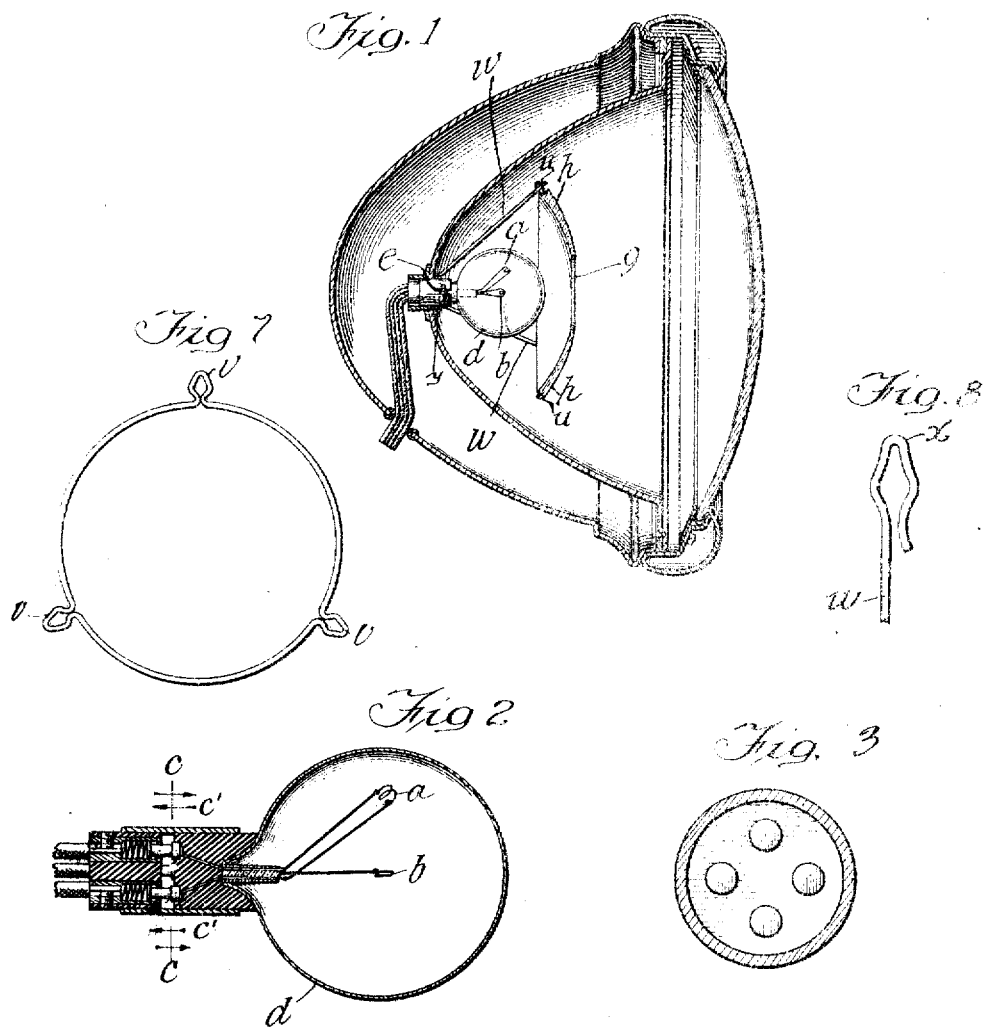

1,274,217.

Patented July 30, 1918.
3 SHEETS—SHEET 3.

Witnesses:
W. P. Kilroy
Harry R. L. White

Simeon Trenner
Inventor.

By
Atty.

UNITED STATES PATENT OFFICE.

SIMEON TRENNER, OF CHICAGO, ILLINOIS.

GLARE-SUBDUING AND LIGHT CONSERVING AND DISTRIBUTING DEVICE FOR HEADLIGHTS OF AUTOMOBILES, &c.

1,274,217.        Specification of Letters Patent.        Patented July 30, 1918.

Application filed October 9, 1916. Serial No. 124,656.

*To all whom it may concern:*

Be it known that I, SIMEON TRENNER, a subject of the United Kingdom of Great Britain and Ireland, residing at No. 817 Crescent Place, in Chicago, Cook county, and State of Illinois, in the United States of America, have invented a new and useful Glare-Subduing and Light Conserving and Distributing Device for Headlights of Automobiles, Motor-Cycles, and other Vehicles, of which the following is a specification.

My invention relates to improvements in the headlights of automobiles, motor-cycles and other vehicles, in which a concentrated and brilliant source of light is used in connection with a parabola or other form of reflector, and the object of my invention is to subdue the dangerous blinding glare due to the projection above the horizontal of a great volume of approximately parallel rays of light, by deflecting portions of the reflected beam to the middle distance of the road-bed at the same time conserving as many of the light rays as possible for general illumination and as a warning signal of approach.

I attain this object by the device illustrated in the accompanying drawings.

Figure 10:
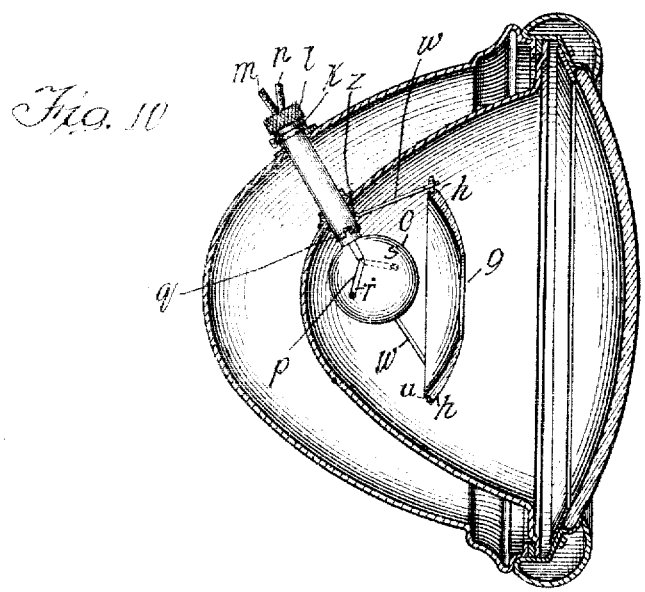
Figure 11:
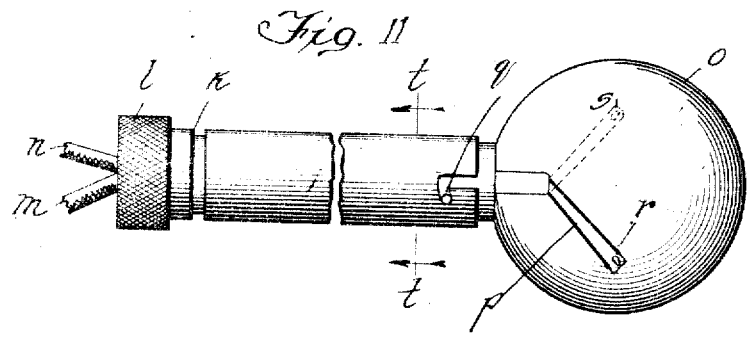
Figure 12:
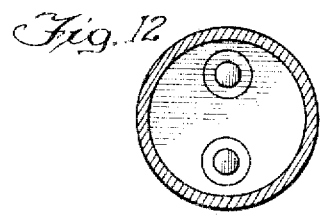

Figure 1 is a longitudinal section of an automobile headlight, illustrating my device in place in the headlight. Fig. 2 is the incandescent electric lamp shown in Fig. 1, showing the connection of the lamp with the socket of the headlight. Figs. 3 and 4 are cross sections of the headlight socket at point of connection with the base of the incandescent electric lamp, shown in Fig. 2. Fig. 5 is a diagram of an electric circuit showing the method by which the filaments of the electric lamp, Fig. 2, are connected with the source of electricity used to illuminate the headlight by means of a two way switch. Fig. 6 is a cross section of the detachable glass annular lenticular convex and fluted canopy which is to be used in connection with the incandescent electric lamp, Fig. 2, showing a wire supporting ring clamping into a recess in the periphery of the canopy and extensions for connection with the wire support illustrated in Figs. 1 and 10. Fig. 7 shows the wire supporting ring which is clamped on the canopy. Fig. 8 shows the spring wire eye of the wire support which fits over the extensions of the supporting ring for the canopy. Fig. 9 is a front view of the canopy in place in an automobile headlight. Fig. 10 is a longitudinal section of an automobile headlight, provided with a diagonally disposed socket placed in the upper part of the headlight, showing a form in which my device may be made. Fig. 11 is a view of the incandescent electric lamp and the diagonally disposed socket in the upper part of the headlight, shown in Fig. 10, and also shows the water tight frictional ring and stuffing box and the knurled plug, with which the diagonally disposed socket is provided. Fig. 12 is a vertical section of the socket of the incandescent electric lamp, shown in Fig. 11 at point $t\ t$, showing metallic spring fingers by means of which the lamp is connected with the source of the electric current used to illuminate the headlight.

Similar letters refer to similar parts throughout the several views.

My device is primarily of simple construction. It may be made so as to be readily attached and adapted to the headlight of automobiles, motor-cycles or other vehicles, provided with a centrally located socket; or it may be readily attached to or adapted to such headlights provided with a socket located in other portions of the headlight.

Fig. 1 shows my entire device in place in a headlight in the form I prefer for attachment or adaptation to existing automobile headlights, provided with a centrally located socket. In this form of my device the incandescent electric lamp, Fig. 2, is provided with two permanently mounted filaments, $a$ and $b$, Figs. 1 and 2. The filament $b$, Figs. 1 and 2, is located at or near the center of the lamp bulb. The filament $a$ Figs. 1 and 2, is adjacent to but placed apart from and above the filament $b$, with its heated portion adjacent to and back of the principal focus of the headlight reflector, and with its heated portion greater from front to rear. I prefer to have the incandescent electric lamp constructed with four severally insulated contacts, as illustrated by Fig. 3, which is a cross section in the line $c\ c$ Fig. 2, of the headlight socket, with the lamp in place in the socket, by means of which the wires connect with the filament $b$ and the filament $a$, Figs. 1 and 2, and that the socket of the headlight be constructed with four spring fingers, as shown in Fig. 4, which is a cross section of the headlight socket, with the lamp in place at the line $c'$ $c'$, Fig. 2. By this means, either of the filaments may be put in metallic contact with the source of electricity used to illuminate the headlight, by using a two-way switch or similar device, as shown in the diagram of an electric circuit, illustrated in Fig. 5. The filament $b$, or the filament $a$, of the incandescent electric lamp, Fig. 2, may be connected with the source of the electric current of the headlight, when the headlight is provided with a socket, having but two insulated contacts by rotation of the plug carrying the leading in wires.

Another form of my device adapted to a headlight provided with a diagonally disposed socket, placed in the upper part of the headlight reflector is illustrated by Fig. 10. The diagonally disposed socket is provided with a water tight frictional ring and stuffing box $k$, Figs. 10 and 11, and a knurled plug $l$, Figs. 10 and 11, containing the leading in wires, $m$ and $n$, Figs. 10 and 11. In this form of my device, the incandescent electric lamp, Figs. 10 and 11, is constructed with one filament, $p$, Figs. 10 and 11, with its luminous portion greater from front to rear, which is positioned in the lamp bulb as to length and angle, so that when it is inserted in the bayonet slots $q$, Figs. 10 and 11, of the diagonally disposed socket of the headlight, or otherwise fitted in place in the diagonally disposed socket of the headlight, and the diagonally disposed socket of the headlight is rotated by means of the knurled plug $l$, Figs. 10 and 11, the heated portion of the filament $p$, Figs. 10 and 11, may be placed at the position $s$, Fig. 10, above the principal axis of the reflector, behind the principal focus of the reflector, or in the position $r$, Fig. 10, at or near the principal axis of the reflector of the headlight. The lamp $o$, Figs. 10 and 11, is connected with the source of electric current, used to illuminate the headlight, by means of the usual spring fingers, illustrated in Fig. 12, which is a section through the diagonally disposed headlight socket at the point $i$ $i$, Fig. 11.

The detachable glass canopy forming a part of my device, $h$ $h$, Figs. 1, 6, 9, and 10, is annular and convex and preferably lenticular and fluted. It may be made prismatic, opalescent or roughened, or with fluted surfaces alternating with plain surfaces. The canopy is so placed between the principal focus and the front glass of the headlight and the parabola of the headlight and with its convexity outward, that a nearby observer sees an enlarged virtual image of the canopy in the parabola of the headlight and with the center of the aperture in the medial portion of the canopy substantially in the principal axis of the reflector, as illustrated by $h$ $h$, Figs. 1 and 10, permitting free egress of light pencils through the aperture at the central portion of the canopy, $g$, Figs. 1, 9 and 10. The canopy may be supported in various ways. I prefer that it be constructed with a groove or recess in the peripheral margin, $u$, Fig. 6, into which a spring wire ring, Fig. 7 is fitted. The wire ring is provided with extensions, $v$, Fig. 7; over these extensions, $v$, Fig. 7, are fitted the spring wire eyes of the support, Fig. 8. The wire support is illustrated by $w$, Figs. 1, and 10, which is attached to the headlight reflector by a collar fitting over the socket of the headlight, $y$, Fig. 1, or is attached to the headlight reflector $z$, Fig. 10. I do not limit myself to this means of supporting the canopy.

The operation of my device is as follows: When the filament $a$, Fig. 1 is illuminated or when the filament $p$, Fig. 10, is placed in the positions, Fig. 10, and illuminated, the illuminated portion of the filament in each case, being above the principal axis of the headlight reflector, and back of the principal focus of the headlight reflector, and having its luminous portion greater from front to rear, the major portion of the light beam is projected to the ground mainly in the middle distance in front of the vehicle for useful illumination, and consequently the blinding glare so dangerous to approaching drivers of automobiles, and to pedestrians, is greatly reduced. Portions of the light beam penetrate the glass annular convex lenticular and fluted canopy $h$ $h$, Figs. 1, 9 and 10, and are by it partly refracted and dispersed, thereby further reducing the glare, and a portion of the light beam passes freely through the aperture in the center of the canopy $g$, Figs. 1, 9 and 10, and through the several minute smooth spaces in the canopy. If the canopy is made with fluted surfaces alternating with small surfaces, a portion of the light beam will pass through the plain surfaces undispersed and will therefore be projected a considerable distance ahead. The near-by observer will see the enlarged virtual image of the canopy, which image will approximate the full size of the headlight, although the canopy itself is much smaller. The small canopy possesses the advantage of being non-dirt collecting, more artistic, less fragile, more convenient, less expensive, and less absorbent than the large prismatic and lenticular devices hitherto used, and permits free egress of the light beams through the aperture at the center, and permits a greater modification of the light.

When the filament $b$, Fig. 1, is illuminated or the filament $p$, Fig. 10, is placed in the position $r$, Fig. 10, and illuminated, a large portion of the light beam penetrates the canopy $h$ $h$, Figs 1, 9 and 10, and portions of the light beam are thereby refracted and dispersed, reducing the blinding glare. The enlarged virtual image above described, is seen by the eye of the near-by observer. A portion of the light beam passes freely through the aperture in the center of the canopy $g$, Figs. 1, 9 and 10. In country driving on unfrequented roads, or when the candle power of the lamp is dimmed electrically by reducing the current, the canopy being of convenient pocket size, may be removed.

I claim and apply for patent on the following:

1. In a vehicle headlight the combination of a reflector having a focal center, an incandescent electric lamp bulb in the reflector, a means located wholly at the rear of the focal center of the reflector for supporting the bulb, said bulb being provided with two filaments, with the heated portion of each greater from front to rear, one of which is positioned with its heated portion at or near the focal center, and on the principal axis of the reflector, and the other filament is positioned with its heated portion substantially vertically above the principal axis of the reflector and at the rear of the focal center of the reflector, and electric circuits whereby either or both of the filaments may be heated at will, and an annular, convex, lenticular, glass canopy, with a fluted surface, positioned between the principal focus and the front glass of the headlight, and with its convexity outward, and with the aperture in the medial portion of the canopy substantially in the principal axis of the reflector, a means of support for the canopy, and a means by which the canopy may be attached to and detached from the means of support.

2. In a vehicle headlight, the combination of a reflector having a focal center and a means of illumination located at or back of the focal center of the reflector and a means of support for the means of illumination, a detachable, annular, lenticular, convex, and fluted glass canopy, positioned between the principal focus and the front glass of the headlight, and with its convexity outward, and with the center of the aperture in the medial portion of the canopy, substantially in the principal axis of the reflector, a means of support for the canopy, and a means whereby the canopy may be attached to and detached from the means of support.

3. In a vehicle headlight, the combination of a reflector having a focal center and a means of illumination located at or back of the focal center of the reflector, and a means of support for the means of illumination, a detachable, annular canopy, made of translucent material, provided with light modifying and distributing surfaces, said canopy being positioned with the plane of its smaller aperture outward, and between the means of illumination of the headlight reflector, and the front glass of the headlight; a means of support for the canopy, and a means whereby the canopy may be attached to and detached from the means of support.

4. In a vehicle headlight, the combination of a reflector having a focal center, a means of illumination located at or back of the focal center of the reflector, and a means of support for the means of illumination, a detachable, annular canopy, frusto-conical in shape, made of translucent material, provided with light modifying and distributing surfaces; said canopy being positioned with the plane of its smaller aperture outward, and between the means of illumination of the headlight reflector, and the front glass of the headlight; a means of support for the canopy, and a means whereby the canopy may be attached to and detached from the means of support.

5. In a vehicle headlight, the combination of a reflector, having a focal center, and a means of illumination located at or back of the focal center of the reflector, and a means of support for the means of illumination, a detachable, annular, glass canopy, with alternate fluted and plain surfaces, positioned between the principal focus and the front glass of the headlight and with its convexity outward, and with the center of the aperture in the medial portion of the canopy, substantially in the principal axis of the reflector, a means of support for the canopy, and a means whereby the canopy may be attached to and detached from the means of support.

6. In a vehicle headlight, the combination of a reflector, having a focal center, and a means of illumination located at or back of the focal center of the reflector, and a means of support for the means of illumination, a detachable, annular glass canopy, with alternate lenticular and plain surfaces, positioned between the principal focus and the front glass of the headlight, and with its convexity outward, and with the center of the aperture in the medial portion of the canopy, substantially in the principal axis of the reflector, a means of support for the canopy, and a means whereby the canopy may be attached to and detached from the means of support.

7. In a vehicle headlight, the combination of a reflector having a focal center, a means of illumination located at or back of the focal center of the reflector, and a means of support for the means of illumination, a detachable annular canopy, frusto-conical in shape, made of translucent material, provided with light modifying and distributing surfaces in which are placed numerous small holes; said canopy being positioned with the plane of its smaller aperture outward and between the means of illumination of the headlight reflector, and the front glass of the headlight; a means of support for the canopy and a means whereby the canopy may be attached to and detached from the means of support.

8. In a vehicle headlight, the combination of a reflector having a focal center, and a means of illumination located at or back of the focal center of the reflector, and a means of support for the means of illumination, a detachable, annular canopy, made of translucent material, provided with light modifying and distributing surfaces, in which are placed numerous small holes; said canopy being positioned with the plane of its smaller aperture outward and between the means of illumination of the headlight reflector and the front glass of the headlight; a means of support for the canopy, and a means whereby the canopy may be attached to and detached from the means of support.

SIMEON TRENNER.

Witnesses:
AARON C. HARFORD,
CHARLES G. HUTCHINSON.